(12) United States Patent
Lake

(10) Patent No.: US 6,575,115 B2  
(45) Date of Patent: *Jun. 10, 2003

(54) THICKNESS GAUGE PIN

(76) Inventor: Ray Keith Lake, 4219 Butterfield, Las Vegas, NV (US) 89103

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,920

(22) Filed: Feb. 22, 1999

(65) Prior Publication Data

US 2002/0000183 A1 Jan. 3, 2002

(51) Int. Cl.[7] ................................................. G01B 5/18
(52) U.S. Cl. ........................ 116/200; 116/201; 33/834
(58) Field of Search ................................. 116/200, 201, 116/205, 209, 227, 109; 33/623, 613, 645, 834; 52/749.1, 750; 427/8, 9, 10; 401/5; 248/205.3; D10/64, 70

(56) References Cited

U.S. PATENT DOCUMENTS

| | | | | |
|---|---|---|---|---|
| 2,315,941 A | * | 4/1943 | D'Amato | 33/458 |
| 2,793,887 A | * | 5/1957 | Moore | 403/291 |
| 2,825,976 A | * | 3/1958 | Radencic | 33/623 |
| 3,246,439 A | * | 4/1966 | Foster, Jr. et al. | 52/698 |
| 3,516,171 A | * | 6/1970 | Martin | 33/293 |
| 3,843,079 A | * | 10/1974 | Reisling | 248/530 |
| 3,910,539 A | * | 10/1975 | Cutler | 248/205.3 |
| 3,973,327 A | * | 8/1976 | Cardinale | 33/494 |
| 4,045,076 A | * | 8/1977 | Day, Sr. et al. | 296/39.3 |
| 4,101,104 A | * | 7/1978 | Minard | 248/95 |
| 4,141,310 A | * | 2/1979 | Rich, Jr. | 33/293 |
| 4,167,259 A | * | 9/1979 | Bury | 248/205.3 |
| 4,229,887 A | * | 10/1980 | Lukits | 434/224 |
| 4,337,666 A | * | 7/1982 | Bhattacharyya et al. | 73/818 |
| 4,370,840 A | * | 2/1983 | Bisbee et al. | 52/410 |
| 4,423,554 A | * | 1/1984 | Cantrell | 33/836 |
| 4,859,183 A | * | 8/1989 | Martin | 433/102 |
| 5,014,946 A | * | 5/1991 | Gruber | 248/206.5 |
| 5,085,431 A | * | 2/1992 | McGuire | 473/386 |
| 5,094,009 A | * | 3/1992 | Koch et al. | 33/834 |
| 5,116,463 A | * | 5/1992 | Lin et al. | 216/18 |
| 5,351,414 A | * | 10/1994 | Cogliano | 33/719 |
| 5,433,413 A | * | 7/1995 | Adams | 248/205.3 |
| 5,498,158 A | * | 3/1996 | Wong | 433/102 |
| 5,518,215 A | * | 5/1996 | Lyons | 248/309.2 |
| 5,609,121 A | * | 3/1997 | Gross | 116/28 R |
| 5,699,591 A | * | 12/1997 | Kane | 24/304 |
| 5,761,819 A | * | 6/1998 | Ledy-Gurren | 33/501 |
| 5,943,784 A | * | 8/1999 | Hiramine | 33/293 |

OTHER PUBLICATIONS

"Insulation Hanger Studs", p. 3017 from the 2002 McMaster-Carr Supply Company catalog, printed from the www.mcmaster.com website on Feb. 26, 2002.*

* cited by examiner

*Primary Examiner*—Diego Gutierrez  
*Assistant Examiner*—R. Alexander Smith  
(74) *Attorney, Agent, or Firm*—Leonard Weiss

(57) ABSTRACT

A gauge pin includes a round rod that extends perpendicularly from a top surface of a disc shaped base. A bottom surface of the base is coated with an adhesive.

9 Claims, 2 Drawing Sheets

THICKNESS GAUGE PIN

BACKGROUND OF THE INVENTION

1. Field of Invention

This invention is in the general field of building construction and, more particularly, relates to measurement of the thickness of a fire resistive material deposited upon a structural member of a building.

2. Description of the Prior Art

Fire prevention in a building typically includes depositing a fire resistive material upon structural members of the building during its construction.

It should be understood that the fire resistive material has its most frequent use where the building is large and structural members are made from steel. Although steel is not flammable, heat from a fire can make steel of a structural member sufficiently malleable to result in a collapse of the building. During a fire, the fire resistive material maintains the steel at a reduced temperature that obviates the collapse of the building.

The fire resistive material is typically mixed with water and deposited as a spray upon the structural member. After being deposited, the thickness of the fire resistive material is measured by a gauge that includes a measuring rod with a pointed end that selectably extends from a sheath. The extension from the sheath is made to substantially equal a minimum acceptable thickness.

The gauge is used by pushing the pointed end of the rod through the fire resistive material to the structural member. When there is a space between the fire resistive material and the sheath, the thickness of the fire resistive material is insufficient.

The fire resistive material may not be of uniform thickness on any given structural member of the building. Additionally, the building may have a plethora of different structural members that require different thicknesses of fire resistant material deposited thereon. Therefore, many measurements may be necessary. The measurements are time consuming and costly.

SUMMARY OF THE INVENTION

An object of the present invention is to easily determine whether the thickness of a fire resistive material deposited upon a structural member of a building either equals or exceeds a minimum thickness.

According to the present invention, a proximal end of a rod is connected to a base to form a structure in the general shape of a nail.

The invention provides a simple, inexpensive device that is easily useable for measuring the thickness of a fire resistive material deposited upon a structural member of a building. The device is of a type that is heretofore unknown in the prior art.

Other objects, features, and advantages of the invention should be apparent from the following description of the preferred embodiment thereof as illustrated in the accompanying drawing.

DESCRIPTION OF THE PREFERRED EMBODIMENT

Figure 1:
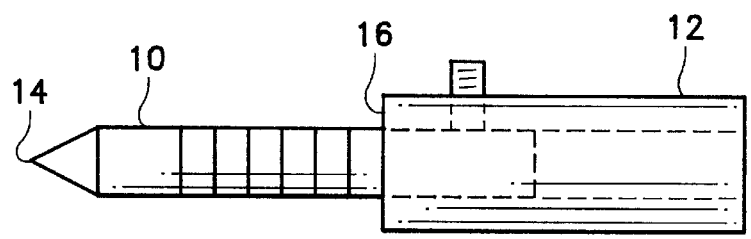
FIG. 1 is a side elevation of a thickness gauge in accordance with the prior art.
Figure 2:
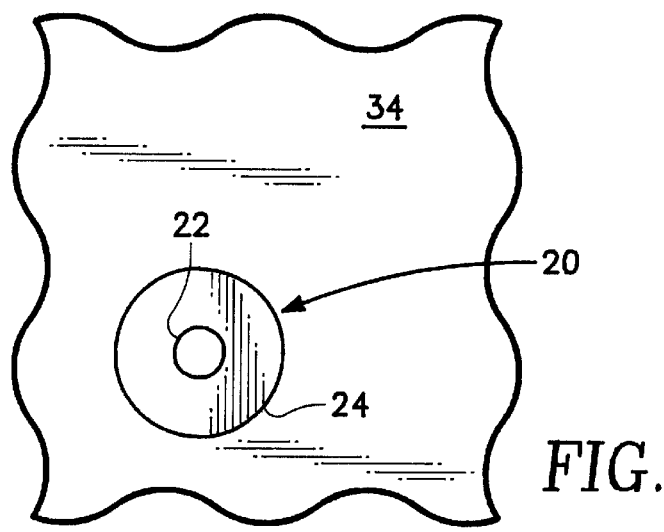
FIG. 2 is a top elevation of the preferred embodiment of the present invention.

As shown in FIG. 1, a thickness gauge of the prior art includes a pointed rod 10 that extends from the interior of a sheath 12. More particularly, a point 14 of the rod 10 and an end 16 of the sheath 10 have a displacement therebetween equal to a minimum acceptable thickness of a fire resistive material deposited upon a structural member of a building. The displacement is maintained by a set screw 18 that extends through the sheath 12 to the rod 10.

The thickness of the fire resistive material is measured by pushing the end 14 through the fire resistive material to the structural member. When there is a space between the end 16 and the fire resistive material, the thickness is insufficient.

As shown in FIGS. 2, 2A, 3 and 4, unlike the prior art, a thickness gauge pin 20, is in the general shape of a nail and is made from a plastic. A round rod 22 has a proximal end 23 connected to a base 24 of the gauge pin 20. The base 24 is a sheet in the shape of a disc. In this embodiment, the rod 22 has a cross-sectional diameter on the order of one fourth of an inch and the base 24 has a diameter on the order of one inch. An alternative embodiment includes a base 24A (FIG. 2A) that is a sheet in the shape of a hexagon.

The rod 22 extends perpendicularly from a top surface 25 of the base 24. A distal end 26 of the rod 22 has a displacement from a bottom surface 28 of the base 24 that substantially equals a minimum desired thickness of the fire resistive material.

Figure 3:
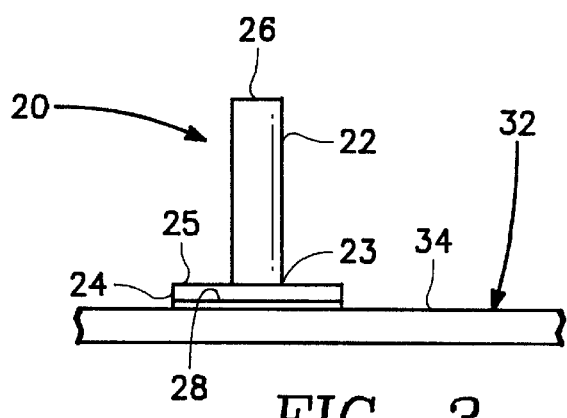
FIG. 3 is a side elevation of the embodiment of FIG. 2.
Figure 4:
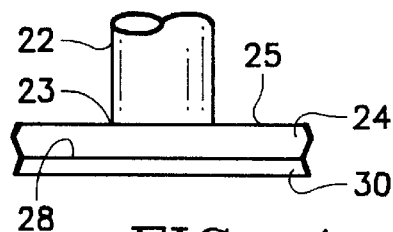
FIG. 4 is an enlarged view of a layer of adhesive carried on a surface of a base of the preferred embodiment.
Figure 2A:
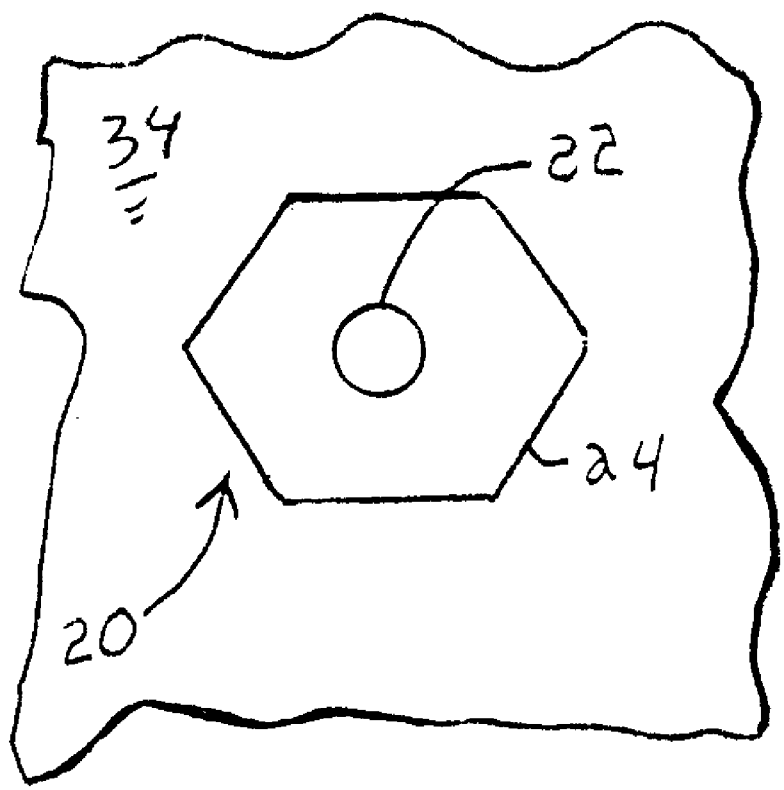
FIG. 2A is a top elevation of an alternative embodiment of the present invention.

In this embodiment, the surface 28 (FIG. 4) is coated with an adhesive 30 whereby the gauge 20 is easily made to adhere to a structural member 32 at a surface 34 thereof (FIG. 3). Preferably, a plurality of gauge pins, similar to the gauge pin 20, are made to adhere to the member 32.

When a deposit of fire resistive material causes none of the plurality of pins to be visible, the thickness of the fire resistive material at the pins is greater than a minimal thickness. In other words, a use of the plurality of pins is equivalent to a like plurality of measurements of fire resistive material having a desired thickness.

The pin 20 may be one of a plurality of pins of differing displacements of the end 26 from the surface 28. A portion of each of the pins is color coded to indicate the displacements. Color coding is well known in the art.

It should be understood that varying thicknesses of fire resistive material may be desired for structures of a building. The color coding facilitates selection of gauge pins by an artisan who desires to provide the fire resistive material of varying thicknesses.

Although in this embodiment, the rod 22 is circular and the any desired polygonal cross-section and the base 24 can be of a sheet of any desired polygonal shape.

I claim:

1. A gauge pin for providing an indication of a desired thickness of a fire resistive material to be sprayed onto a surface of a structural member of a building, comprising:

a base made from a sheet with an adhesive bottom surface whereby said bottom surface is adapted for connection to the surface of the structural member; and a rod having a proximal end connected to a top surface of said base and extending perpendicularly therefrom whereby the gauge pin is formed, a portion of the gauge pin being color coded to be indicative of a displacement of a distal end of said rod from said bottom surface, said displacement being substantially equal to the desired thickness.

2. The gauge pin of claim 1 wherein said base and said rod are made from plastic.

3. The gauge pin of claim 1 wherein said base is in the shape of a disc and said rod is a round rod.

4. The gauge pin of claim 1 wherein said base is in the shape of a polygon.

5. The gauge pin of claim 1 wherein said color coded portion is said rod.

6. The gauge pin of claim 1 wherein said color coded portion is said base.

7. In a method of depositing a fire resistive material upon a surface of a structural member, comprising the steps of:

providing a rod that has a proximal end connected to a top surface of a sheet, said rod extending perpendicularly therefrom to cause a distal end of said rod to have a displacement from a bottom surface of said sheet that substantially equals a specified minimum thickness of the fire resistive material;

adhering said bottom surface of said sheet to the surface of the structural member; and depositing the fire resistive material upon the surface of the structural member until the rod is no longer visible.

8. In the method of claim 7 wherein said step of providing includes color coding said rod to indicate said displacement of said distal end of said rod from said bottom surface of said sheet.

9. In the method of claim 7 wherein said step of providing includes color coding said sheet to indicate said displacement of said distal end of said rod from said bottom surface of said sheet.

* * * * *